United States Patent
Takahashi et al.

(10) Patent No.: US 10,767,035 B2
(45) Date of Patent: *Sep. 8, 2020

(54) METHOD FOR PRODUCING THERMOPLASTIC RESIN COMPOSITION FILM

(71) Applicant: RIKEN TECHNOS CORPORATION, Tokyo (JP)

(72) Inventors: Tomohiro Takahashi, Tokyo (JP); Hidemasa Sugimoto, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/517,927

(22) PCT Filed: Sep. 11, 2015

(86) PCT No.: PCT/JP2015/075795
§ 371 (c)(1),
(2) Date: Apr. 7, 2017

(87) PCT Pub. No.: WO2016/056347
PCT Pub. Date: Apr. 14, 2016

(65) Prior Publication Data
US 2017/0306132 A1     Oct. 26, 2017

(30) Foreign Application Priority Data
Oct. 9, 2014   (JP) .................................. 2014-207986

(51) Int. Cl.
*B29C 43/24*   (2006.01)
*B29C 43/52*   (2006.01)
(Continued)

(52) U.S. Cl.
CPC .............. *C08L 23/04* (2013.01); *B29C 43/24* (2013.01); *B29C 43/52* (2013.01); *B32B 9/007* (2013.01);
(Continued)

(58) Field of Classification Search
CPC . B32B 9/007; B32B 9/045; B29K 2105/0047; C08L 23/04; C08L 2205/02;
(Continued)

(56) References Cited

U.S. PATENT DOCUMENTS 9,660,271 B2 * 5/2017 Takahashi ............. H01M 8/188
9,748,017 B2 * 8/2017 Takahashi ................ H01B 1/24
(Continued)

FOREIGN PATENT DOCUMENTS

CN    1366679 A    8/2002
CN    1898753 A    1/2007
(Continued)

OTHER PUBLICATIONS

Machine English translation of JP 2013-216786, Takahashi et al., Oct. 24, 2013.*
(Continued)

*Primary Examiner* — Patrick D Niland
(74) *Attorney, Agent, or Firm* — Bracewell LLP; Brad Y. Chin (57) ABSTRACT

Embodiments provide a method for producing a film including a thermoplastic resin composition, the method including: (1) a step of subjecting a thermoplastic resin composition to preliminary heating at 100-250° C.; (2) a step of subjecting a first roller and second roller of a calender roll film-forming apparatus to pre-heating; and (3) a step of introducing the thermoplastic resin composition, which has been subjected to preliminary heating in step (1), into the clearance between the first roller and second roller, which have been pre-heated (Continued)

in step (2), and continuously winding a molten film of the thermoplastic resin composition on the first roller. According to at least one embodiment, the rotational speed of the first roller is higher than the rotational speed of the second roller. According to at least one embodiment, the thermoplastic resin composition contains (A) 100 parts by mass of a thermoplastic resin, (B) 1-60 parts by mass of carbon nanotubes and (C) 1-100 parts by mass of at least one type of material selected from the group consisting of acetylene black and graphite.

18 Claims, 1 Drawing Sheet

(51) Int. Cl.
    *B32B 9/00*       (2006.01)
    *B32B 9/04*       (2006.01)
    *C08J 5/18*       (2006.01)
    *C08K 3/04*       (2006.01)
    *C08L 23/04*      (2006.01)
    *C08L 23/06*      (2006.01)
    *C08L 23/28*      (2006.01)
    *B29L 31/34*      (2006.01)
    *B29K 105/00*     (2006.01)

(52) U.S. Cl.
    CPC .............. *B32B 9/045* (2013.01); *C08J 5/18* (2013.01); *C08K 3/04* (2013.01); *C08K 3/041* (2017.05); *C08L 23/06* (2013.01); *C08L 23/286* (2013.01); *B29K 2105/0047* (2013.01); *B29L 2031/3468* (2013.01); *C08J 2323/06* (2013.01); *C08J 2323/28* (2013.01); *C08L 2205/02* (2013.01)

(58) Field of Classification Search
    CPC ........ C08L 23/06; C08L 23/286; B29C 43/24; B29C 43/52; B29L 2031/3468; C08J 5/18; C08J 2323/06; C08J 2323/28; C08K 3/04; C08K 3/041
    See application file for complete search history.

(56) References Cited

U.S. PATENT DOCUMENTS

| | | | |
|---|---|---|---|
| 2008/0099732 A1 | 5/2008 | Nagao et al. | |
| 2009/0011318 A1 | 1/2009 | Sasaki et al. | |
| 2010/0163795 A1 | 7/2010 | Kim et al. | |
| 2011/0147640 A1 | 6/2011 | Kim et al. | |
| 2011/0180762 A1 | 7/2011 | Sasaki et al. | |
| 2011/0193030 A1 | 8/2011 | Kolditz et al. | |
| 2011/0193031 A1 | 8/2011 | Kolditz et al. | |
| 2011/0315934 A1 | 12/2011 | Ma et al. | |
| 2013/0037760 A1 | 2/2013 | Maeda et al. | |
| 2014/0148537 A1* | 5/2014 | Suzuki | ............... D01F 1/10 524/186 |

FOREIGN PATENT DOCUMENTS

| | | |
|---|---|---|
| CN | 101768367 A | 7/2010 |
| CN | 102124056 A | 7/2011 |
| CN | 102844926 A | 12/2012 |
| EP | 1052654 A1 | 11/2000 |
| EP | 2560228 A1 | 2/2013 |
| EP | 2717352 A1 | 4/2014 |
| EP | 2837661 A1 | 2/2015 |
| JP | H01149370 A | 6/1989 |
| JP | H04259754 A | 9/1992 |
| JP | H0753813 A | 2/1995 |
| JP | H08259767 A | 10/1996 |
| JP | H09262855 A | 10/1997 |
| JP | H1067866 A | 3/1998 |
| JP | 11035077 A | 2/1999 |
| JP | 2001015144 A | 1/2001 |
| JP | 2003182763 A | 7/2003 |
| JP | 2005200620 A | 7/2005 |
| JP | 2006111870 A | 4/2006 |
| JP | 2007090859 A | 4/2007 |
| JP | 2008062497 A | 3/2008 |
| JP | 2009155436 A | 7/2009 |
| JP | 2011228059 A | 11/2011 |
| JP | 2012500317 A | 1/2012 |
| JP | 2012507586 A | 3/2012 |
| JP | 2012507587 A | 3/2012 |
| JP | 2012221775 A | 11/2012 |
| JP | 2013163762 A | 8/2013 |
| JP | 2013216786 A | 10/2013 |
| TW | 201143191 A | 12/2011 |
| TW | 201200553 A1 | 1/2012 |
| WO | 2005056685 A1 | 6/2005 |
| WO | 2006106609 A1 | 10/2006 |
| WO | 2010021437 A1 | 2/2010 |
| WO | 2010038784 A1 | 4/2010 |
| WO | 2011129215 A1 | 10/2011 |
| WO | 2013153969 A1 | 10/2013 |
| WO | 2015037383 A | 3/2015 |

OTHER PUBLICATIONS

Machine English translation of JP 2008-062497, Aoki et al., Mar. 21, 2008.*
Trrow, W. V., PVC Technology, Elsevier Applied Science Publishers Ltd, 1984, pp. 803-848. (Year: 1984).*
Machine English translation of JP 09-262855, Hiroyuki et al., Oct. 7, 1997.*
PCT/JP2015/075795 International Search Report dated Nov. 17, 2015; 3 pgs.
PCT/JP2014/071286 International Search Report dated Nov. 11, 2014; 15pgs.
EP13776098 Search Report dated Nov. 11, 2015; 7pgs.
PCT/JP2013/059640 International Search Report and Written Opinion dated May 28, 2013; 7pgs.
Takase, "Dispersion Technique and Evaluation of Carbon Nanotubes", Seikei-Kako,vol. 18, No. 9, 2006, pp. 646-652; 9pgs.
EP14844477.1 Partial Search Report dated Mar. 15, 2017; 6pgs.
EPN410433EP Extended European Search Report dated Mar. 27, 2018; 8 pages.
JP2014-207986 Office Action dated Jun. 5, 2018, 11 pgs.

* cited by examiner

METHOD FOR PRODUCING THERMOPLASTIC RESIN COMPOSITION FILM

CROSS REFERENCE TO RELATED APPLICATIONS

This application claims the benefit of and priority to PCT/JP2015/075795, filed on Sep. 11, 2015, entitled (translation), "METHOD FOR PRODUCING THERMOPLASTIC RESIN COMPOSITION FILM," which claims the benefit of and priority to Japanese Patent Application No. 2014-207986, filed on Oct. 9, 2014, each of which is hereby incorporated by reference in their entirety into this application.

BACKGROUND

Field

Embodiments relate to a method for producing a film including a thermoplastic resin composition. More specifically, embodiments relate to a method for producing a film including a thermoplastic resin composition including a large number of parts of a filler, and in particular a film including an electrically conductive thermoplastic resin composition suitable for electrodes in storage batteries and a protective coating on the electrode.

Description of Related Art

Recently, so-called renewable energies including solar power, wind power, and wave power have garnered attention as new alternative energy sources to fossil fuels, such as petroleum, and nuclear energy. However, the output of this renewable energy is extremely unstable due to being highly susceptible to weather and the like. Accordingly, in order to transfer this energy to power networks in large quantities, it is necessary to level the variation in output by, for example, equipping them with large-capacity storage batteries.

One example of such a large-capacity storage battery is a redox flow battery. Redox flow batteries contain two types of ionic solutions separated by a cation-exchange membrane and operate via charges/discharges by allowing oxidation and reduction reactions to simultaneously proceed on electrodes provided in the respective solutions. For example, in the case of a redox flow battery using an aqueous solution of vanadium in sulfuric acid for both electrodes, during charging, tetravalent vanadium is oxidized to pentavalent vanadium on the anode, while trivalent vanadium is reduced to divalent vanadium on the cathode. During discharging, the reverse reactions occur. Redox flow batteries are advantageous due to the ease with which the size of a facility can be increased. In addition, redox flow batteries operate at room temperature and do not use combustible or explosive substances or lead to the generation of such substances. Therefore, redox flow batteries have excellent safety compared with sodium-sulfur batteries and lithium-ion secondary batteries.

Electrodes in redox flow batteries are soaked in an electrolytic solution such as an aqueous solution of sulfuric acid, with redox reactions occurring thereon. Therefore, because the electrodes require high conductivity and chemical resistance, carbon fiber aggregates or platinum plating are used for the electrodes. However, carbon fiber aggregates are permeable to liquids, making them disadvantageous in that the connection part between the carbon fiber aggregate and copper wire is eroded due to the transportation of aqueous solutions of sulfuric acid and the like. Meanwhile, while platinum plating is a very good conductor with excellent chemical resistance, it is disadvantageous in that, as a noble metal, it is expensive.

Accordingly, an electrically conductive resin film in which an electrically conductive carbon such as Ketjen black is kneaded has been used as an electrode (e.g., see Patent Literature 1 to 4); alternatively, an electrode of carbon fiber aggregate or copper sheeting has been coated with such an electrically conductive resin film. However, these electrically conductive resin films are disadvantageous in that a large quantity of electrically conductive carbon kneaded therein for the purpose of imparting sufficiently high conductivity makes film-forming difficult. Meanwhile, if the amount of electrically conductive carbon to be formulated is reduced to ensure film formability, the volume resistivity exceeds 10 $\Omega \cdot cm$. Redox flow batteries using such an electrically conductive film as an electrode, or as a coating thereon, are not satisfactory in that the internal resistance is increased.

On the other hand, recently, carbon nanotubes have garnered attention as an electrically conductive carbon expected to solve the above disadvantages (e.g., see Patent Literature 5 and Non Patent Literature 1). However, it is difficult to defibrate carbon nanotubes, making carbon nanotubes disadvantageous in that they are very difficult to disperse in resin. Consequently, in order to obtain sufficiently high conductivity, a large quantity of carbon nanotubes must be formulated as with Ketjen black, thereby making film formability insufficient in practical use. Further, if higher shear stress is applied in the step of defibrating/dispersing for the purpose of improving the defibrated/dispersed state of carbon nanotubes, the carbon nanotubes will break. Thus, even if higher shear stress is applied in the step of defibrating/dispersing, it is still necessary to formulate a large quantity of carbon nanotubes in order to obtain sufficiently high conductivity.

An electrically conductive film has also been proposed comprising a composition obtained by mixing a carbon black or carbon nanotubes with a propylene-olefin copolymer wax to prepare a master batch and mixing this with an organic polymer, (e.g., see Patent Literature 6 and 7). Although this master batch allows a large quantity of a carbon black or carbon nanotubes to be filled, the obtained film tends to have insufficient conductivity.

CITATION LIST

Patent Literature 1: JP-A-1-149370
Patent Literature 2: JP-A-4-259754
Patent Literature 3: JP-A-7-053813
Patent Literature 4: JP-A-2001-015144
Patent Literature 5: JP-A-2006-111870
Patent Literature 6: JP-A-2012-507586
Patent Literature 7: JP-A-2012-507587
Non-Patent Literature: Takase, "Dispersion Technique and Evaluation of Carbon Nanotubes," Seikei-Kako, Vol. 18, No. 9, 2006, pp. 646-652.

SUMMARY

Embodiments provide a method for producing a film including a thermoplastic resin composition including a large number of parts of a filler. Further, embodiments provide a method for producing a film including an electrically conductive thermoplastic resin composition that has high conductivity and excellent tensile elongation, bending resistance, and flexibility, and that is suitable as an electrode in electrolytic solution-circulating secondary batteries, such as redox flow batteries, zinc-chlorine batteries and zinc-bromine batteries, as well as a protective coating of the electrode.

According to various embodiments, there is provided a thermoplastic resin composition that is subjected to preliminary heating at a specific temperature and then a film using a calender-roll film-forming apparatus is formed.

According to at least one embodiment, there is provided a method for producing a film including a thermoplastic resin composition, in which the method includes (1) a step of subjecting a thermoplastic resin composition to preliminary heating at 100 to 250° C., (2) a step of subjecting a first roller and second roller of a calender-roll film-forming apparatus to pre-heating, and (3) a step of introducing the thermoplastic resin composition, which has been subjected to preliminary heating in step (1), into a clearance between the first roller and second roller, which have been pre-heated in step (2), and continuously winding a melted film of the thermoplastic resin composition on the first roller.

According to at least one embodiment, a rotation rate of the first roller is faster than a rotation rate of the second roller.

According to at least one embodiment, the method further includes (4) a step of, on the first roller, continuously trimming both sides of the melted film and then continuously peeling the melted film off from the first roller.

According to at least one embodiment, the thermoplastic resin composition includes: (A) 100 parts by mass of a thermoplastic resin; (B) 1 to 60 parts by mass of carbon nanotubes, and (C) 1 to 100 parts by mass of at least one selected from the group consisting of acetylene black and graphite.

According to at least one embodiment, the thermoplastic resin (A) is a resin mixture including: (A1) 30 to 80% by mass of a chlorinated polyethylene having a chlorine content of 20 to 45% by mass, and (A2) 70 to 20% by mass of a polyethylene other than (A1), wherein the sum of (A1) and (A2) is 100% by mass.

According to at least one embodiment, the highest melting point among peak top melting points in a DSC melting curve of component (A2) is 110° C. or lower.

According to at least one embodiment, component (A1) is amorphous.

According to at least one embodiment, thermoplastic resin (A) is (A3) a polyethylene satisfying the following properties (p) and (q): (p) the highest melting point among peak top melting points in a DSC melting curve is 120° C. or higher, and (q) a fraction of melting enthalpy in a temperature range of 110° C. or lower relative to the total melting enthalpy in a DSC melting curve is 50 to 80%.

According to at least one embodiment, the thermoplastic resin composition includes: (A) 100 parts by mass of a thermoplastic resin, and (D) 100 to 400 parts by mass of a bentonite.

According to at least one embodiment, the thermoplastic resin composition include: (A) 100 parts by mass of a thermoplastic resin, and (E) 20 to 300 parts by mass of at least one selected from the group consisting of zeolite, silver zeolite, and copper zeolite.

According to another embodiment, there is provided a film produced by the method describe above.

According to another embodiment, there is provided a battery including the film described above.

DETAILED DESCRIPTION

The production method according to various embodiments is a method for forming a film including a thermoplastic resin composition and includes (1) a step of subjecting the thermoplastic resin composition to preliminary heating at 100 to 250° C.

The thermoplastic resin composition including a large number of parts of a filler is disadvantageous in that setting the temperatures of the first roller and second roller high can decrease the peelability from the rollers (i.e., the melted film sticks to the rollers and cannot be peeled off). On the other hand, the temperatures of the first roller and second roller can be set low to ensure peelability from the rollers. In this case, however, for example because the thermoplastic resin composition includes a large number of parts of component (B) and component (C) and has high heat radiation properties, or because it includes a large number of parts of component (D) or component (E) and has high viscosity, the heat imparted from the first roller and second roller of the calender-roll film-forming apparatus and the heat generated by the shear stress received at a clearance between the first roller and second roller cannot provide sufficient quantity of heat on their own. Thus, setting the temperatures of the first roller and second roller low while giving priority to ensuring peelability from the rollers can prevent the thermoplastic resin composition from being stably and continuously turned into a melted film due to insufficient quantity of heat. In consideration of these difficulties, according to various embodiments, the thermoplastic resin composition is firstly subjected to preliminary heating before being introduced between the first roller and second roller of the calender-roll film-forming apparatus such that it may be stably and continuously turned into a melted film.

In order to stably and continuously turn the thermoplastic resin composition into a melted film, the lower limit temperature of the preliminary heating is 100° C. or higher, and preferably 130° C. or higher. More preferably, it is 150° C. or higher. From the viewpoint of inhibiting thermal degradation of the thermoplastic resin composition along with ensuring peelability from the rollers, the upper limit of the preliminary heating temperature is usually 250° C. or lower, preferably 220° C. or lower, more preferably 200° C. or lower, and further preferably 190° C. or lower.

The method of preliminary heating is not particularly limited and may be carried out by any method. For example, extruders such as planetary multi-screw extruders, co-rotating twin-screw extruders, counter-rotating twin-screw extruders, and single-screw extruders, as well as batch kneaders such as pressure kneaders and mixers may be used. Using such apparatuses to melt and knead the thermoplastic resin composition, a thermoplastic resin composition that has been subjected to preliminary heating may be obtained which is strand-shaped, sheet-shaped, rod-shaped, scrap-shaped, small lump-shaped, etc.

The production method according to at least one embodiment includes (2) a step of subjecting a first roller and second roller of a calender-roll film-forming apparatus to pre-heating. It is to be noted herein that, of the first two rollers among the rollers of a calender-roll film-forming apparatus, the roller on which the melted film is to be wound is referred to as the first roller and the other as the second roller in describing the various embodiments.

According to at least one embodiment, the lower limit of the pre-heating temperature of the first roller and second roller is not particularly limited as long as the thermoplastic resin composition may be stably and continuously turned into a melted film, but it is usually 100° C. or higher, preferably 130° C., more preferably 150° C. or higher, and further preferably 160° C. or higher. In addition, the upper limit of the pre-heating temperature for the first roller and second roller is not particularly limited as long as the peelability from the rollers of the melted film may be ensured, but it is usually 250° C. or lower, preferably 220° C. or lower, more preferably 200° C. or lower, and further preferably 190° C. or lower. Further, the temperature of the first roller is preferably set higher than the temperature of the second roller because the melted film of the thermoplastic resin composition easily tends to wind on the roller having a higher temperature due to the properties thereof. Accordingly, for the calender-roll film-forming apparatus, an apparatus that can control the temperature of the first roller and the temperature of the second roller individually is preferably used.

According to at least one embodiment, the production method includes (3) a step of introducing the thermoplastic resin composition, which has been subjected to preliminary heating in step (1), into a clearance between the first roller and second roller, which have been pre-heated in step (2), and continuously winding a melted film of the thermoplastic resin composition on the first roller.

Upon being introduced into the clearance between the first roller and second roller that have been pre-heated in step (2), the thermoplastic resin composition that has been subjected to preliminary heating in step (1) is successively rolled into a melted film by being sandwiched between the first roller and second roller and continuously wound on the first roller. The rotation rate of each of these rollers is not particularly limited because it depends on many parameters such as the production scale and components of the thermoplastic resin, but it may be, for example, within the range of 0.5 rpm to 60 rpm, usually within the range of 1 rpm to 30 rpm, and more typically within the range of 1 rpm to 20 rpm.

In calender-roll film-forming, the rotation rate of the first roller is preferably made faster than the rotation rate of the second roller because the melted film of the thermoplastic resin composition easily tends to wind on the roller having a faster roller rotation rate due to the properties thereof. Accordingly, for the calender-roll film-forming apparatus, an apparatus that can control the rotation rate of the first roller and the rotation rate of the second roller individually is preferably used. When the rotation rate of the first roller is made faster than the rotation rate of the second roller, the speed ratio thereof is not particularly limited but may be, for example, within the range of 1.01:1 to 3:1, and typically within the range of 1.1:1 to 1.5:1.

In addition, because the thermoplastic resin composition has very high viscosity as it comprises a large number of parts of component (B) and component (C), or component (D) or component (E) or the like, a roller of a highly rigid material and/or structure is preferably used for the first roller and second roller. Examples of the roller of a highly rigid material include forged steel rollers, special forged steel rollers, special heat-treated ductile rollers, tough ductile rollers, and graphite-crystallized adamite rollers. Examples of the roller of a highly rigid structure include rollers with a large roller diameter and drilled rollers. The use of a highly rigid roller makes the sandwiching force and rolling force by the first roller and second roller uniform in the film width direction, allowing a film with uniform thickness distribution in the width direction to be obtained.

The production method according to at least one embodiment preferably further includes (4) a step of, on the first roller, continuously trimming both sides of the melted film and then continuously peeling the melted film off from the first roller.

According to at least one embodiment, the melted film that has yet to be cooled and solidified easily tends to tear as the thermoplastic resin composition comprises a large number of parts of component (B) and component (C), or component (D) or component (E) or the like. Consequently, if the melted film is flawed somewhere on its sides (edges in the film direction) during film-forming, the flaw is allowed to propagate when the melted film is peeled off, causing the melted film to tear. In view of this, the melted film is continuously peeled off from the first roller and, before it is transferred to the next step, both sides of the melted film (both edges in the film width direction) are continuously trimmed on the first roller. The term "trimming" as referred to herein means the operation to cut both edges of the melted film each predetermined location such that the width of the melted film is made uniform.

According to at least one embodiment, the trimming is preferably carried out by introducing trimming blades into both sides of the melted film wound on the first roller such that the trimming blades are pressed against the first roller. The material and shape of the trimming blades are not particularly limited, with any trimming blade capable of being used.

According to at least one embodiment, the melted film that has been peeled off from the first roller is cooled and solidified as necessary and wound up to obtain a film including the thermoplastic resin composition.

According to at least one embodiment, the calender-roll film-forming apparatus is not particularly limited, with any apparatus capable of being used. Examples thereof include a two-roll type, upright three-roll type, upright four-roll type, L-shaped four-roll type, inverted L-shaped four-roll type, Z-shaped roll type, L-shaped six-roll type, and inverted L-shaped six-roll type.

Hereinafter, the thermoplastic resin composition used in the production method according to various embodiments will be described.

1. Electrically Conductive Thermoplastic Resin Composition

One case in which the production method according to at least one embodiment is particularly useful is when forming a film including an electrically conductive thermoplastic resin composition including (A) 100 parts by mass of a thermoplastic resin; (B) 1 to 60 parts by mass of carbon nanotubes; and (C) 1 to 100 parts by mass of at least one selected from the group consisting of acetylene black and graphite.

(A) Thermoplastic Resin

The thermoplastic resin as component (A) accepts carbon nanotubes as component (B) and at least one selected from the group consisting of acetylene black and graphite as component (C), and ensures film formability in addition to imparting mechanical properties such as tensile elongation, bending resistance, and flexibility to a film to be obtained. The thermoplastic resin as component (A) is not particularly limited as long as it has the effects described above.

One preferable thermoplastic resin as component (A) is a thermoplastic resin mixture including (A1) 30 to 80% by mass of a chlorinated polyethylene having a chlorine content of 20 to 45% by mass and (A2) 70 to 20% by mass of a polyethylene other than (A1). Here, the sum of (A1) and (A2) is 100% by mass. Using this thermoplastic resin mixture as component (A), a film can be obtained which has extremely good resistance to aqueous solutions of vanadium sulfate, especially. More preferably, the contents of component (A1) and component (A2) are 50 to 65% by mass and 50 to 35% by mass, respectively.

(A1) Chlorinated Polyethylene

The chlorinated polyethylene having a chlorine content of 25 to 45% by mass as component (A1) plays an important role in ensuring resistance to an aqueous solution of vanadium sulfate of a film to be obtained. On the other hand, due to the chlorine contained therein, care should be taken so as not to cause trouble such as burning during processing. Accordingly, the chlorine content is preferably 20 to 45% by mass. A chlorine content of 45% by mass or less can suppress the occurrence of trouble such as burning during processing. On the other hand, from the viewpoint of achieving the objective of formulating chlorinated polyethylene to ensure resistance to an aqueous solution of vanadium sulfate, the chlorine content is preferably 20% by mass or more. The chlorine content of component (A1) is more preferably 25 to 40% by mass.

The chlorinated polyethylene as component (A1) is not limited except that its chlorine content preferably falls within the predetermined range, with any chlorinated polyethylene capable of being used. Examples thereof include those that have been obtained by chlorinating any polyethylene using any chlorination method, comprising the aqueous suspension method. The polyethylene to be chlorinated is not particularly limited, with examples thereof including a low-density polyethylene, a linear low-density polyethylene, an ultra-low-density polyethylene, a high-density polyethylene, an ethylene homopolymer, a copolymer of ethylene and an α-olefin (e.g., one or two or more of 1-butene, 1-hexene, 1-octene and the like) and any mixtures thereof.

In addition, the chlorinated polyethylene as component (A1) is preferably amorphous from the viewpoint of reducing shear stress during processing to prevent trouble such as burning along with dispersing component (B) and component (C) well to make the initial conductivity good.

It is to be noted herein that an amorphous chlorinated polyethylene is defined as one which has no clear melting peak or one which has a melting peak at which the amount of heat of melting (ΔH) is less than 10 J/g in a second melting curve (i.e. a melting curve determined during the last temperature elevation process) determined by using a Diamond DSC-type differential scanning calorimeter from PerkinElmer Japan Co., Ltd. with a program to retain at 190° C. for 5 minutes, cool to −10° C. at 10° C./min, retain at −10° C. for 5 minutes and raise the temperature to 190° C. at 10° C./min.

In addition, the chlorinated polyethylene as component (A1) is preferably one having high fluidity from the viewpoint of reducing shear stress during processing to prevent trouble such as burning along with dispersing component (B) and component (C) well to make the initial conductivity good. The melt flow rate (hereinafter, sometimes abbreviated as MFR-A1) measured in accordance with HS K7210: 1999 under conditions of 180° C. and 211.8 N is preferably 10 g/10 min or more, and more preferably 50 g/10 min or more. On the other hand, MFR-A1 of component (A1) is preferably 500 g/10 min or less from the viewpoint of achieving a sufficient acceptability for component (B).

Examples of such a chlorinated polyethylene commercially available include "ELASLEN 303A" (trade name) and "ELASLEN 302NA" (trade name) from Showa Denko K.K.

(A2) Polyethylene Different from (A1)

The polyethylene as component (A2) is not particularly limited as long as it is a polyethylene different from (A1). Typically, the polyethylene as component (A2) is not chlorinated. The polyethylene as component (A2) is preferably not chlorinated. For the polyethylene as component (A2), for example, one of a low-density polyethylene, a linear low-density polyethylene, an ultra-low-density polyethylene, a high-density polyethylene, an ethylene homopolymer, a copolymer of ethylene and an α-olefin (e.g., one or two or more of 1-butene, 1-hexene, 1-octene and the like) can be used singly, or a mixture in which any two or more of them are formulated can be used. In the case where such a mixture is used, the mixture preferably satisfies the following Tm-A2 range or the following MFR-A2 range as a whole.

The polyethylene as component (A2) plays an important role to ensure film formability. Therefore, component (A2) is preferably excellent in filler loading property, and the highest melting point among peak top melting points in the DSC melting curve of component (A2) (hereinafter, sometimes abbreviated as Tm-A2) is preferably 110° C. or lower. This Tm-A2 is more preferably 105° C. or lower. Meanwhile, Tm-A2 of component (A2) is preferably 60° C. or higher from the viewpoint of suppressing the swelling due to an electrolytic solution.

It is to be noted herein that the highest melting point among peak top melting points in a DSC melting curve means the highest melting point among peak top melting points in a second melting curve (i.e., a melting curve determined during the last temperature elevation process) determined by using a Diamond DSC-type differential scanning calorimeter from PerkinElmer Japan Co., Ltd. with a program to retain at 190° C. for 5 minutes, cool to −10° C. at 10° C./min, retain at −10° C. for 5 minutes and raise the temperature to 190° C. at 10° C./min.

In addition, the polyethylene of component (A2) is preferably one having a high fluidity from the viewpoint of reducing a shear stress during processing to prevent a trouble such as burning. The melt flow rate of component (A2) (hereinafter, sometimes abbreviated as MFR-A2) measured in accordance with JIS K7210:1999 under conditions of 190° C. and 21.18 N is preferably 1 g/10 min or more, and more preferably 5 g/10 min or more. On the other hand, MFR-A2 of component (A2) is preferably 100 g/10 min or less from the viewpoint of achieving a fluidity allowing to ensure a sufficient acceptability for component (B).

(A3) Polyethylene Satisfying Properties (p) and (q)

Other preferable examples of the thermoplastic resin as component (A) include (A3) a polyethylene satisfying the following properties (p) and (q):

(p) the highest melting point among peak top melting points in a DSC melting curve is 120° C. or higher; and (q) the fraction of melting enthalpy in a temperature range of 110° C. or lower relative to the total melting enthalpy in a DSC melting curve is 50 to 80%.

A resin composition obtained by using this component (A3) as the thermoplastic resin of component (A) is particularly excellent in film formability, and a film formed from the resin composition is particularly excellent in heat resistance and bending resistance.

Property (p)

This property (p) is an indicator of the heat resistance of a polyethylene, and it can be determined by using the above method. In the case where the highest melting point among peak top melting points in the DSC melting curve of component (A3) (hereinafter, sometimes abbreviated as Tm-A3) is 120° C. or higher, that is, component (A3) satisfies the property (p), a film excellent in bending resistance and heat resistance can be obtained. Higher Tm-A3 is preferred. Tm-A3 is preferably 125° C. or higher, and more preferably 130° C. or higher. Although the upper limit of Tm-A3 is not particularly specified, it is around 135° C. at the highest as being a polyethylene.

Property (q)

Figure 1:
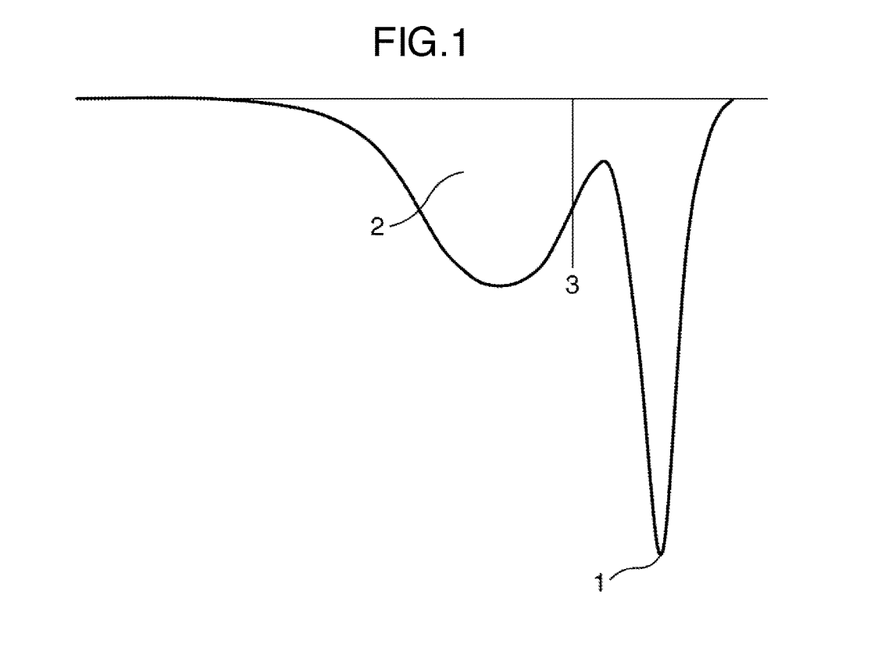
FIG. 1 is a conceptual drawing of a DSC melting curve.

This property (q) is an indicator of the filler loading property of a polyethylene, which is the fraction of melting enthalpy in a temperature range of 110° C. or lower relative to the total melting enthalpy in a DSC second melting curve determined by using the above method. The conceptual drawing is shown in FIG. 1. In FIG. 1, the signs 1, 2 and 3 indicate the highest melting point among peak top melting points in a DSC second melting curve, an integration of melting enthalpy in a temperature range of 110° C. or lower in the DSC second melting curve, and a boundary line at a temperature of 110° C. in the DSC second melting curve, respectively. In the case where the fraction of melting enthalpy in a temperature range of 110° C. or lower relative to the total melting enthalpy (hereinafter, sometimes abbreviated as Xc) in the DSC melting curve of component (A3) is 50% or higher, or more preferably 60% or higher, a resin composition having an excellent processability can be obtained. On the other hand, Xc of component (A3) is 80% or less, and more preferably 70% or less from the viewpoint of the bending resistance and the heat resistance of a film to be formed.

The polyethylene of component (A3) is not particularly limited as long as being a polyethylene satisfying the above properties (p) and (q). Examples thereof include a low-density polyethylene, a linear low-density polyethylene, an ultra-low-density polyethylene, a high-density polyethylene, a copolymer of ethylene and an α-olefin (e.g., one or two or more of 1-butene, 1-hexene, 1-octene and the like).

For the polyethylene of component (A3), one of these can be used singly, or a mixture in which any two or more of them are formulated can be used. In the case where such a mixture is used, the mixture may only satisfy the above properties (p) and (q) as a whole.

(B) Carbon Nanotubes

The carbon nanotubes as component (B) serve as an electrically conductive filler to impart high conductivity to a film to be obtained.

The carbon nanotubes as component (B) are comprised of a fibrous substance having a diameter of around 1 to 250 nm and a length of around 0.1 to 250 μm, which is a single- or multi-layered coaxial tube six-membered ring network made from carbon atoms (graphene sheet). Because the carbon nanotubes as component (B) serve as an electrically conductive filler to impart high conductivity to a film to be obtained, it is preferably one having less lattice defects and high conductivity. In addition, one having a small bulk specific gravity is preferred because it is easily defibrated.

Examples of commercially available products of such carbon nanotubes include "Nanocyl NC7000" (trade name) from Nanocyl S.A. and "VGCF-X" (trade name) from Showa Denko K.K.

The amount of the carbon nanotubes as component (B) to be formulated is 1 to 60 parts by mass, and preferably 20 to 45 parts by mass based on 100 parts by mass of component (A). When the amount of component (B) to be formulated is within the above ranges, a film may be obtained that compatibly achieves sufficient electrical conductivity and excellent tensile elongation, bending resistance, and flexibility.

(C) At Least One Selected from the Group Consisting of Acetylene Black and Graphite The acetylene black and/or graphite as component (C) keep film formability and assist component (B) to be defibrated/highly dispersed, resulting in an increase in the electrical conductivity of the film and improvement in mechanical properties such as tensile elongation and bending resistance. In addition, since component (C) has conductivity in itself, it also serves on its own to increase the conductivity of a film.

Acetylene Black

Acetylene black, made of carbon fine particles produced by pyrolysis of an acetylene as, is an electrically conductive carbon black having a structure which is partially graphitized. Examples of commercially available products of acetylene black include "DENKA BLACK" (trade name) from Denki Kagaku Kogyo K.K.

Graphite

Graphite is also called black lead and is a mineral formed from carbon atoms. Graphite encompasses natural graphite such as flake graphite and amorphous graphite, along with synthetic graphite such as pyrolytic graphite. According to at least one embodiment, ground graphite is used. Ground graphite preferably has a mean particle diameter of 10 μm or less, and more preferably 5 μm or less. Using ground graphite with a mean particle diameter of 10 μm or less, moderate film elongation may be obtained without causing holes in the electrically conductive resin film or formation of convex portions on the surface of the film. The mean particle diameter herein is the particle diameter at an accumulation of 50% by mass in a particle diameter distribution curve measured using a laser diffraction and scattering type particle diameter analyzer "MT3200II" (trade name) from Nikkiso Co., Ltd.

The amount of acetylene black and/or graphite as component (C) to be formulated is 1 part by mass or more, preferably 6 parts by mass or more, and more preferably 10 parts by mass or more based on 100 parts by mass of component (A) from the viewpoint of tensile elongation and bending resistance. Meanwhile, from the viewpoint of electrolytic solution resistance, tensile elongation, and bending resistance, the amount of acetylene black and/or graphite as component (C) to be formulated is 100 parts by mass or less, preferably 60 parts by mass or less, more preferably 40 parts by mass or less, and further preferably 30 parts by mass or less.

Ketjen black as well as acetylene black is known as an electrically conductive carbon black. Ketjen black has high electrical conductivity. However, because Ketjen black has a hollow shell form, unlike acetylene black, a resin composition obtained by kneading Ketjen black as a measure amount of the conductive filler together with component (A), or together with component (A) and component (B), does not exhibit ductility in melting in the film-forming step and, therefore, is difficult to form into a film.

The thermoplastic resin composition can further include known additives, for example, additives such as lubricants, antioxidants, anti-aging agents, weatherability stabilizers such as photostabilizers and ultraviolet absorbers, thermal stabilizers, copper inhibitors, release agents, and surfactants as long as they do not impair the object of the present invention. The amount of such additives to be formulated may be around 0.001 to 5 parts by mass based on 100 parts by mass of component (A).

In addition, inorganic fillers other than component (B) and component (C) can be further contained in the thermoplastic resin composition as long as they do not impair the various embodiments. Examples of such inorganic fillers include precipitated calcium carbonate, ground calcium carbonate, hydrated magnesium silicate, and talc. The amount of the inorganic filler to be formulated may be around 1 to 20 parts by mass based on 100 parts by mass of component (A).

The thermoplastic resin composition can be obtained by melt-kneading components (A) to (C) and other optional component(s) as desired, with the use of any melt-kneader. Examples of the melt-kneader include a batch-type kneader such as a pressurizing kneader and a mixer; an extrusion kneader such as a co-rotational twin-screw extruder and a counter-rotational twin-screw extruder; and a calender-roll kneader. These may be used in any combination. The obtained resin composition may be pelletized using any method, and thereafter may be used in the film-forming method according to at least one embodiment. Alternatively, the step of melt-kneading using a melt-kneader to obtain a thermoplastic resin composition may be carried out in step (1) of the film-forming method according to at least one embodiment.

2. Water-Absorbing Thermoplastic Resin Composition

One other case in which the production method according to at least one embodiment is particularly useful is when forming a film including a water-absorbing thermoplastic resin composition including (A) 100 parts by mass of a thermoplastic resin and (D) 100 to 400 parts by mass of a bentonite.

(A) Thermoplastic Resin

The thermoplastic resin as component (A) accepts bentonite as component (D), and ensures film formability in addition to imparting mechanical properties such as tensile elongation, bending resistance, and flexibility to a film to be obtained.

Examples of the thermoplastic resin as component (A) include polyolefin resins such as polyethylene, polypropylene, polybuten-1, poly(4-methylpentene-1), chlorinated polyethylene, ethylene-α-olefin copolymers, ethylene-vinyl acetate copolymers, and ethylene-acrylate copolymers; polyvinyl chloride resins such as polyvinyl chloride and vinyl chloride-vinyl acetate copolymers; polyamide resins such as nylon 11 and nylon 12; polyurethane resins; non-crystalline, low-crystalline or crystalline polyester resins; acrylonitrile-butadiene-styrene copolymers (ABS resins); hydrogenated styrenic elastomers such as hydrogenated styrene-conjugated diene copolymers; acrylic resins; silicone resins; polyvinylidene chloride resins; and chloroprene resins. Of these, the thermoplastic resin as component (A) is preferably a polyethylene, and more preferably a polyethylene with a density of 910 kg/m$^3$ or less. For component (A), one of these or a mixture of two or more thereof may be used.

(D) Bentonite

The bentonite as component (D) is a weak alkaline clay having montmorillonite as the major component thereof. Component (D) imparts a water-absorbing function to the thermoplastic resin composition. Accordingly, for the bentonite as component (D), the swelling volume measured in accordance with the test method (volumetric method) of the Japan Bentonite Manufacturers Association Standard (JBAS-104-77) is preferably 5 to 95 ml/2 g, and more preferably 27 to 92 ml/2 g.

Examples of bentonite as component (D) include pulverized natural bentonites, refined bentonites obtained by removing admixture components from natural bentonites by any method such as the dissolution-reprecipitation method as well as the centrifugal separation method, refined bentonites surface-treated with a silane compound having a long chain alkyl group, and modified bentonites obtained by causing a refined bentonite to physically absorb an anionic polymer and the like. Of these, from the viewpoints of fouling resistance of the metal rollers of a forming machine, peelability from the metal rollers, and the like, natural bentonites and refined bentonites with no surface treatments are preferred, with refined bentonites with no surface treatments more preferred from the viewpoint of water absorption. For component (D), one of these or a mixture of two or more thereof may be used.

The amount of the bentonite as component (D) to be formulated is preferably 100 parts by mass or more, further preferably 200 parts by mass or more based on 100 parts by mass of component (A) from the viewpoint of water-absorbing function. On the other hand, the amount of the bentonite as component (D) to be formulated is preferably 400 parts by mass or less, and more preferably 300 parts by mass or less from the viewpoint of film formability.

3. Deodorant Thermoplastic Resin Composition

Another case in which the production method according to at least one embodiment is particularly useful is when forming a film including a deodorant thermoplastic resin composition including (A) 100 parts by mass of a thermoplastic resin and (E) 20 to 300 parts by mass of at least one selected from the group consisting of zeolite, silver zeolite, and copper zeolite.

(A) Thermoplastic Resin

The thermoplastic resin as component (A) accepts at least one selected from the group consisting of zeolite, silver zeolite, and copper zeolite as component (E), and ensures film formability in addition to imparting mechanical properties such as tensile elongation, bending resistance, and flexibility to a film to be obtained.

Examples of the thermoplastic resin as component (A) include polyolefin resins such as polyethylene, polypropylene, polybuten-1, poly(4-methylpentene-1), chlorinated polyethylene, ethylene-α-olefin copolymers, ethylene-vinyl acetate copolymers, and ethylene-acrylate copolymers; polyvinyl chloride resins such as polyvinyl chloride and vinyl chloride-vinyl acetate copolymers; polyamide resins such as nylon 11 and nylon 12; polyurethane resins; non-crystalline, low-crystalline or crystalline polyester resins; acrylonitrile-butadiene-styrene copolymers (ABS resins); hydrogenated styrene-based elastomers such as hydrogenated styrene-conjugated diene copolymers; acrylic resins; silicone resins; polyvinylidene chloride resins; and chloroprene resins. Of these, the thermoplastic resin as component (A) is preferably a polyethylene, and more preferably a polyethylene with a density of 910 kg/m$^3$ or less. For component (A), one or two or more of these may be used.

(E) At Least One Selected from the Group Consisting of Zeolite, Silver Zeolite, and Copper Zeolite A zeolite is a substance having a structure in which the Si$^{4+}$ in a silicate is substituted with Al$^{3+}$ (alumino silicate). It has micropores in the crystal and can attract cations with its negative charge to absorb and retain them. Among alumino silicates, silver zeolite is a substance that comprises Ag$^+$ such that the positive charge that is lost by substituting Si$^{4+}$ with Al$^{3+}$ is thereby compensated for, while copper zeolite is a substance that comprises Cu$^{2+}$ in the same manner. Component (E) imparts a deodorant function to the thermoplastic resin composition.

The amount of at least one selected from the group consisting of zeolite, silver zeolite, and copper zeolite as component (E) to be formulated is preferably 20 parts by mass or more, more preferably 50 parts by mass or more, and further preferably 70 parts by mass or more based on 100 parts by mass of component (A) from the viewpoint of deodorant function. On the other hand, the amount of component (E) to be formulated is preferably 300 parts by mass or less, more preferably 280 parts by mass or less, and further preferably 250 parts by mass or less from the viewpoint of film formability.

The thickness of the film obtained according to the production method of the present invention is not particularly limited. For example, when it is used as electrode members in a redox flow battery (storage battery) using an aqueous solution of vanadium in sulfuric acid for both electrodes, the film may be 100 to 1000 μm thick. In addition, the film may be cross-linked and cured by a known method, such as electron beam irradiation, to enhance its heat resistance and solvent resistance.

The film obtained according to the production method according to various embodiments may be used as an electrode in electrolytic solution-circulating secondary batteries such as redox flow batteries, zinc-chlorine batteries, and zinc-bromine batteries, as well as a protective coating of the electrode.

EXAMPLES

Embodiments will be described below with Examples, but is not limited thereto.

Methods for Determining Physical Properties (i) Initial Conductivity (Ω1)

Figure 2:
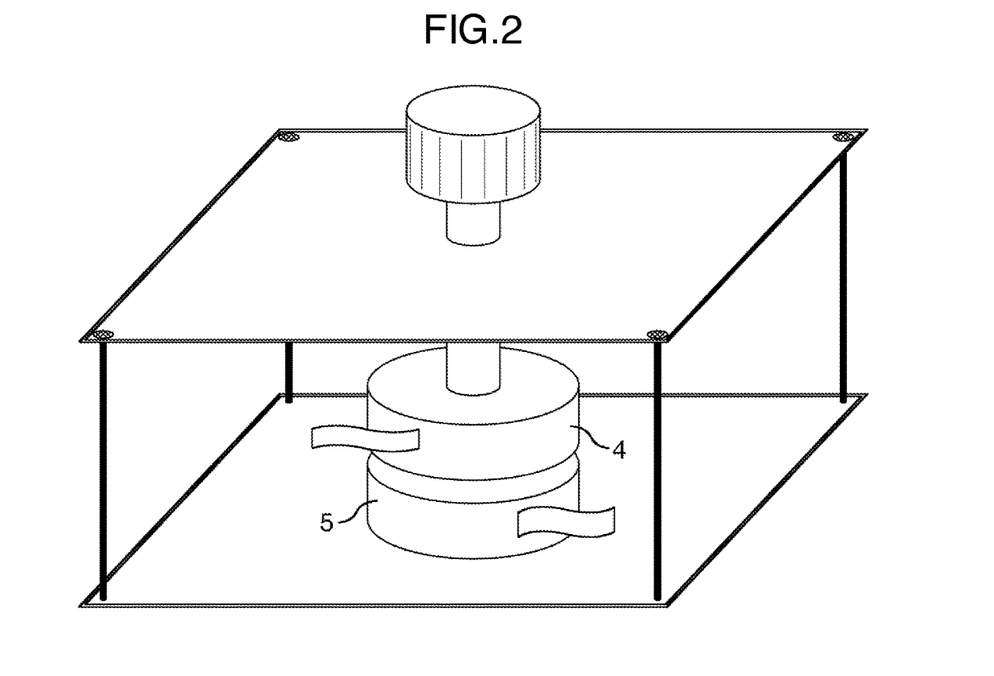
FIG. 2 is a conceptual drawing of a device for measuring initial conductivity $\Omega 1$ according to an embodiment.

A device (see FIG. 2) was used having an electrode 4 and another electrode 5 each of which had a cylindrical shape with a diameter of 36 mm and a height of 10 mm and made of brass (material number C2600 defined in JIS) and a screw to press the electrode 4 and the electrode 5. A film was sandwiched between the electrode 4 and the electrode 5 in the device, to which a resistivity meter "AC Milliohm Hi-Tester 3560" (trade name) from HIOKI E.E. Corporation was connected. Next, the screw was further tightened to a tightening torque of 0.3 N-m and the resistance value 5 minutes after a given torque was reached was measured as the initial conductivity (unit: mΩ).

(ii) Electrolytic Solution Resistance

A small piece of film obtained by cutting a film to a size of 40 mm (in the machine direction of the film)×40 mm (in the width direction of the film) was soaked in an aqueous solution (concentration: 2.0 mole/liter) of vanadium sulfate (oxidation number of the vanadium: 5) at normal temperature (temperature: 23±2° C.) for 7 days followed by washing with water. Thereafter, the surface of the film was visually observed and the electrolytic solution resistance was evaluated using the following criteria.

⊚ (Good): No change was observed on the surface of the film.

○ (Generally good): A mottled pattern was observed on the surface of the film.

Δ (Slightly poor): A rainbow-colored mottled pattern like an oil film was generated on part of the surface of the film.

X (Poor): A rainbow-colored mottled pattern like an oil film was generated on the entire surface of the film.

(iii) Volume Resistivity ρ

The volume resistivity of a film was measured using the four-point probe array method (probe method) in accordance with JIS K7194:1994. A film in a state which had been regulated in a testing room having a temperature of 23±2° C. and a relative humidity of 50±5% for 24 hours or longer was cut to a size of 80 mm (in the machine direction of the film)×50 mm (in the width direction of the film) to prepare a test piece. The volume resistivity value was measured for five measurement positions per test piece using a resistivity meter "Loresta GP MCP-T610" (trade name) from Mitsubishi Chemical Analytech Co., Ltd. with probes aligned at equal intervals (interval between probes: 5 mm). This measurement was performed for three test pieces and the average value of the total 15 volume resistivity values was defined as the volume resistivity p of the film. The thickness of the film was measured in accordance with a method for measuring the dimensions of a test piece defined in JIS K7194 using a dial thickness gauge "H-1A" (trade name) from OZAKI MFG. CO., LTD. Regarding methods for measuring electric resistivity and the theory thereon, you can make a reference to the website of Mitsubishi Chemical Analytech Co., Ltd. (http://www.mccat.co.jp/3seihin/genri/ghlup2.htm), for example.

(iv) Bending Resistance

A test piece of the type 1B test piece defined in JIS K7127 was stamped out from a film in a state which had been regulated in a testing room having a temperature of 23±2° C. and a relative humidity of 50±5% for 24 hours or longer such that the machine direction of the film corresponded to the tensile direction, and the test piece was bent by 180° such that the chucked portions at both ends of the test piece totally met. After passing the bent portion between fingers to firmly press it therebetween, the film was raised. Subsequently, the film was similarly bent by 180° in the opposite direction, and after passing the bent portion between fingers to firmly press it therebetween, the film was bent back. This one set operation in which bending and bending back are performed in one direction followed by bending and bending back at the same bent portion in the opposite direction was repeated to evaluate the bending resistance using the following criteria.

⊚ (Good): The film was not broken even after the 10th set.

○ (Generally good): The film was broken after initiation of the 6th set and before or on completion of the 10th set.

Δ (Slightly poor): The film was broken after initiation of the 2nd set and before or on completion of the 5th set.

X (Poor): The film was broken before or on completion of the 1st set.

(v) Bending Resistance after Heat-Moisture Treatment

A test piece of the type 1B test piece defined in HS K7127 was stamped out from a film which had been exposure-treated in a thermo-hygrostat chamber having a temperature of 60±2° C. and a relative humidity of 98% for 7 days such that the machine direction of the film corresponded to the tensile direction, and the test piece was bent by 180° such that the chucked portions at both ends of the test piece totally met. After passing the bent portion between fingers to firmly press it therebetween, the film was bent back. Subsequently, the film was similarly bent by 180° in the opposite direction, and after passing the bent portion between fingers to firmly press it therebetween, the film was bent back. This one set operation in which bending and bending back are performed in one direction followed by bending and bending back at the same bent portion in the opposite direction was repeated to evaluate using the following criteria.

⊚ (Good): The film was not broken even after the 10th set.

○ (Generally good): The film was broken after initiation of the 6th set and before or on completion of the 10th set.

Δ (Slightly poor): The film was broken after initiation of the 2nd set and before or on completion of the 5th set.

X (Poor): The film was broken before or on completion of the 1st set.

(vi) Tensile Elongation

The tensile elongation of a film was measured in accordance with JIS K7127:1999. Taking the width direction of the film as the tensile direction, a tensile test was performed for a film in a state which had been regulated in a testing room having a temperature of 23±2° C. and a relative humidity of 50±5% for 24 hours or longer to determine the value of the elongation at breaking using a tensile tester "AUTOGRAPH AGS-1kNG" (trade name) available from Shimadzu Corporation under the following conditions: type 1 test piece (dumbbell); initial distance between chucks: 120 mm; distance between bench mark lines: 50 mm; and tensile speed: 5 mm/min. This test was performed on five test pieces to calculate the average value, which was defined as the tensile elongation E of the film. The thickness of the film between the bench mark lines was measured (at 10 points in total) using a dial thickness gauge "H-1A" (trade name) available from OZAKI MFG. CO., LTD. to calculate the average value, which was used as the film thickness.

(vii) Water-Absorbing Function

A sample film was dried in an oven having a temperature of 60° C. for 24 hours to measure the dry mass, after which the film was exposed to an environment having a temperature of 40° C. and a relative humidity of 90% for 24 hours to measure the mass after processing. The amount of water absorption was calculated using the following equation:

Amount of water absorption (g/m$^2$)=[Mass after processing (g)−Dry mass (g)]/Surface area of the sample film (m$^2$)

(viii) Deodorant Function 20 ml of an ammonia aqueous solution comprising 0.5 g of ammonium per 100 ml (obtained by diluting the "Ammonia water of 10 w/v % listed in the Pharmacopoeia of Japan" available from KENEI Pharmaceutical Co., Ltd. with distilled water at a dilution ratio of 20) was poured into a 150-ml disposable cup made of polypropylene (vacuum type) ("V-150" (model number) available from AS ONE Corporation), which in turn was put into a 350-ml SM sample bottle made of glass that comes with a bottle cap made of polypropylene and an inner plug made of polyethylene ("85-0684-2" (product code) available from Sansyo Co., Ltd.) and allowed to stand still in an oven having a temperature of 60° C. for 24 hours. Then, after the sample bottle was removed from the oven and the disposable cup containing the ammonia water was immediately taken out, the bottle was plugged up again and allowed to stand still until it reached normal temperature. Subsequently, a piece of a film cut to the size of 15 cm long and 7 cm wide was put into the sample bottle and the bottle was plugged up again. A sensory test was carried out for ammonia odor two hours thereafter and evaluated using the following criteria. In the test, another sample bottle that had been handled in the same manner except that no piece of film had been put into it was used as a control sample.

⊚ (Good): The sample in question exhibited no ammonia odor.

○ (Generally good): The sample in question only exhibited a faint ammonia odor.

Δ (Slightly poor): The sample in question exhibited less ammonia odor than the control sample.

X (Poor): The sample in question exhibited ammonia odor of substantially the same strength as that of the control sample.

Raw Materials Used

Component (A1)

(A1-1): chlorinated polyethylene "Elaslen 303A" (trade name) available from Showa Denko K.K., chlorine content: 32% by mass, melt flow rate (at 180° C., 211.8 N): 120 g/10 min, heat of melting: 2 J/g (A1-2): chlorinated polyethylene "Elaslen 303B" (trade name) available from Showa Denko K.K., chlorine content: 32% by mass, melt flow rate (at 180° C., 211.8 N): 25 g/10 min, heat of melting: 50 J/g (A1-3): chlorinated polyethylene "Elaslen 404B" (trade name) available from Showa Denko K.K., chlorine content: 40% by mass, melt flow rate (at 180° C., 211.8 N): 25 g/10 min, heat of melting: 29 J/g Component (A2)

(A2-1): polyethylene "ENGAGE 8402" (trade name) available from The Dow Chemical Company, melt flow rate (at 190° C., 21.18 N): 30 g/10 min, density: 877 kg/m$^3$, Tm-A2: 99° C.

(A2-2): polyethylene "ULTZEX 20200J" (trade name) available from Prime Polymer Co., Ltd., melt flow rate (at 190° C., 21.18 N): 18.5 g/10 min, density: 918 kg/m$^3$, Tm-A2: 125° C.

Component (A3)

(A3-1): polyethylene "ULTZEX 20200J" (trade name) available from Prime Polymer Co., Ltd., melt flow rate (at 190° C., 21.18 N): 18.5 g/10 min, density: 918 kg/m$^3$, Tm-A3: 125° C., Xc: 62%

(A3-2): polyethylene "NEO-ZEX 2024G" (trade name) available from Prime Polymer Co., Ltd., melt flow rate (at 190° C., 21.18 N): 25 g/10 min, density: 915 kg/m$^3$, Tm-A3: 120° C., Xc: 75%

(A3-3): a 40/60 (mass ratio) mixture of polyethylene "Evolue SP4530" (trade name) available from Prime Polymer Co., Ltd., melt flow rate (at 190° C., 21.18 N): 2.8 g/10 min, density: 942 kg/m$^3$, Tm-A3: 132° C., Xc: 20%; and component (A3'-2) described in the following, Tm-A3: 132° C., Xc: 68%

Component (A3')

(A3'-1): polyethylene "D9100.00" (trade name) available from The Dow Chemical Company, melt flow rate (at 190° C., 21.18 N): 1 g/10 min, density: 877 kg/m$^3$, Tm-A3: 118° C., Xc: 29%

(A3'-2): polyethylene "ENGAGE 8402" (trade name) available from The Dow Chemical Company, melt flow rate (at 190° C., 21.18 N): 30 g/10 min, density: 877 kg/m$^3$, Tm-A3: 99° C., Xc: 100%

(A3'-3): polyethylene "Evolue SP4530" (trade name) available from Prime Polymer Co., Ltd., melt flow rate (at 190° C., 21.18 N): 2.8 g/10 min, density: 942 kg/m$^3$, Tm-A3: 132° C., Xc: 20%

(A3'-4): a 50/50 (mass ratio) mixture of (A3'-1) and (A3'-2), Tm-A3: 118° C., Xc: 65%

Component (A4)

(A4-1): polyethylene "INFUSE9507" (trade name) available from The Dow Chemical Company, melt flow rate (at 190° C., 21.18 N): 5 g/10 min, density: 866 kg/m$^3$ Component (B)

(B-1): Multi-layered carbon nanotubes "NANOCYL NC7000" (trade name) available from NANOCYL S.A., average diameter: 9.5 nm, average length: 1.5 μm, bulk specific density: 0.043 g/cm³, purity: 90% by mass Component (C)

(C-1): acetylene black "DENKA BLACK Granule" (trade name) available from Denki Kagaku Kogyo Kabushiki Kaisha, average particle diameter of primary particle: 35 nm (determined by observation under an electron microscope (TEM)), specific surface area: 69 m²/g (C-2): ground natural graphite "Z-5F" (trade name) available from Ito Graphite Co., Ltd., flaky, average particle diameter of primary particle: 4 μm Comparative Component (C')

(C'-1): Ketjen black "KJ300" (trade name) available from Lion Corporation

Component (D)

(D-1): purified bentonite "BEN-GEL" (trade name) available from Hojun Co., Ltd., swelling volume: 35 ml/2 g (D-2): purified bentonite "BEN-GEL SH" (trade name) available from Hojun Co., Ltd., swelling volume: 92 ml/2 g (D-3): natural bentonite "SUPER CLAY" (trade name) available from Hojun Co., Ltd., swelling volume: 32 ml/2 g (D-4): purified bentonite "BEN-GEL BRITE11" (trade name) available from Hojun Co., Ltd., swelling power: 6 ml/2 g Component (E)

(E-1): natural zeolite "SGW" (trade name) available from Zeeklite Kabushiki Kaisha, average particle diameter: 10 μm Component (F): Optional Component (F-1): a stabilizer for a chlorinated polyethylene "STANN JF-95B" (trade name) available from Nitto Kasei Kyogyo K. K.

Component (G)

(G-1): polyethylene "ULTZEX 20200J" (trade name) available from Prime Polymer Co., Ltd., melt flow rate (at 190° C., 21.18N) 18.5 g/10 min, density: 918 kg/m³, Tm-A2: 125° C.

(G-2): inorganic flame retardant (magnesium hydroxide) "KISUMA 5P" (trade name) available from Kyowa Chemical Industry Co., Ltd.

Component (H)

(H-1): ethylene vinyl acetate copolymer "Ultrasen 710" (trade name) available from Tosoh Corporation, melt flow rate (at 190° C., 21.18N) 18 g/10 min, content of structural units derived from vinyl acetate: 28% by mass (H-2): purified bentonite "BEN-GEL" (trade name) available from Hojun Co., Ltd., swelling volume: 35 ml/2 g Example 1

A formulation having the formulation ratio shown in Table 1 was melt-kneaded using a 5-liter "Intensive Mixer" (trade name) available from Nippon Roll MFG. Co., Ltd., which was then pelletized using a hot-cut process to obtain pellets of a thermoplastic resin composition. After that, the obtained pellets of the thermoplastic resin composition were subjected to preliminary heating at 160° C. using a planetary multi-screw extruder, and they were then introduced into a clearance between the first roller and second roller of a two-roll type calender-roll film-forming apparatus having a roller diameter of 305 mm (12 inches) and a roller width of 920 mm available from Nippon Roll MFG. Co., Ltd., to cause the melted film of the thermoplastic resin composition to continuously wind on the first roller, with the first roller set to a temperature of 175° C. and a rotation rate of 2.6 rpm, and the second roller set to a temperature of 170° C. and a rotation rate of 2.0 rpm. Subsequently, by inserting trimming blades into both sides of the melted film wound on the first roller such that the trimming blades were pressed against the first roller, the both sides of the melted film were continuously trimmed on the first roller. After the melted film was continuously peeled off from the first roller, it was cooled and solidified to obtain a film having a thickness of 300 μm. In addition, the film-forming method in which trimming of both sides is carried out after peeling rather than on the first roller was attempted, whereby a film having a thickness of 300 μm was able to be obtained without trouble. The tests (i) to (vi) for physical properties were performed for the obtained film. The results are shown in Table 1.

Comparative Example 1

Film-forming was attempted in the same manner as in Example 1 in all respects except that the preliminary heating temperature was changed to 90° C. However, the melted film was not able to be stably and continuously produced. Thus, evaluation of the film was omitted.

Example 2

The same procedures as in Example 1 were followed in all respects except that the preliminary heating temperature was changed to 130° C., whereby a film with a thickness of 300 μm was obtained. It is to be noted that when the film-forming method in which trimming of both sides is carried out after peeling rather than on the first roller was attempted, there were sometimes cases where a flaw(s) occurring on the side(s) of the melted film at the time of peeling the melted film propagated to tear the melted film. Therefore, it was found that at a preliminary temperature of 130° C., trimming needs to be carried out on the first roller. The tests (i) to (vi) for physical properties were performed for the obtained film. The results are shown in Table 1.

Comparative Example 2

Film-forming was attempted in the same manner as in Example 1 in all respects except that the preliminary heating temperature was changed to 260° C. Although the film itself was able to be formed, a strong hydrogen chloride odor occurred. It was inferred that this phenomenon was due to thermal degradation of the chlorinated polyethylene component of the thermoplastic resin composition. Thus, evaluation of the film was omitted.

Example 3

The same procedures as in Example 1 were followed in all respects except that the preliminary heating temperature was changed to 180° C., whereby a film with a thickness of 300 μm was obtained. In addition, even with the film-forming method in which trimming of both sides is carried out after peeling rather than on the first roller, a film having a thickness of 300 μm was able to be obtained without trouble. The tests (i) to (vi) for physical properties were performed for the obtained film. The results are shown in Table 1.

Example 4

The same procedures as in Example 1 were followed in all respects except that the first roller temperature was changed to 155° C. and the second roller temperature was changed to 150° C., whereby a film with a thickness of 300 μm was obtained. In addition, even with the film-forming method in which trimming of both sides is carried out after peeling rather than on the first roller, a film having a thickness of 300 µm was able to be obtained without trouble. The tests (i) to (vi) for physical properties were performed for the obtained film. The results are shown in Table 1.

Example 5

The same procedures as in Example 1 were followed in all respects except that the first roller temperature was changed to 135° C. and the second roller temperature was changed to 130° C., whereby a film with a thickness of 300 µm was obtained. It is to be noted that when the film-forming method in which trimming of both sides is carried out after peeling rather than on the first roller was attempted, there were sometimes cases where a flaw(s) occurring on the side(s) of the melted film at the time of peeling the melted film propagated to tear the melted film. Thus, it was found that trimming needs to be carried out on the first roller under the conditions of a first roller temperature of 135° C. and a second roller temperature of 130° C. The tests (i) to (vi) for physical properties were performed for the obtained film. The results are shown in Table 1.

attempted in the same manner as in Example 1 except that the film-forming conditions were changed as shown in Table 2 below.

For Examples B1, B3, and B4, the film was able to be stably obtained either via the method of carrying out trimming on the roller, or via the film-forming method of carrying out trimming of both sides after peeling rather than on the first roller.

For Example B2 and Example B5, the film was able to be stably obtained via the method of carrying out trimming on the roller. In the film-forming method in which trimming of both sides is carried out after peeling rather than on the first roller, however, there were sometimes cases where a flaw(s) occurring on the side(s) of the melted film at the time of peeling the melted film propagated to tear the melted film. In order to stably obtain the film, it is considered necessary to carry out trimming on the roller.

For the Comparative Example B1, the film was not able to be stably obtained because the temperature of preliminary heating was too low.

TABLE 1

| | | Example 1 | Example 2 | Example 3 | Example 4 | Example 5 | Comparative Example 1 | Comparative Example 2 |
|---|---|---|---|---|---|---|---|---|
| Amount of each component (parts by mass) | (A1-1) | 60 | 60 | 60 | 60 | 60 | 60 | 60 |
| | (A1-2) | — | — | — | — | — | — | — |
| | (A1-3) | — | — | — | — | — | — | — |
| | (A2-1) | 40 | 40 | 40 | 40 | 40 | 40 | 40 |
| | (A2-2) | — | — | — | — | — | — | — |
| | (B-1) | 35 | 35 | 35 | 35 | 35 | 35 | 35 |
| | (C-1) | 40 | 40 | 40 | 40 | 40 | 40 | 40 |
| | (C'-1) | — | — | — | — | — | — | — |
| | (F-1) | 2 | 2 | 2 | 2 | 2 | 2 | 2 |
| Film-forming conditions | Preliminary heating temperature (° C.) | 160 | 130 | 180 | 160 | 160 | 90 | 260 |
| | First roller temperature (° C.) | 175 | 175 | 175 | 155 | 135 | 175 | 175 |
| | Second roller temperature (° C.) | 170 | 170 | 170 | 150 | 130 | 170 | 170 |
| Evaluation results | Initial conductivity (mΩ) | 77 | 79 | 77 | 80 | 80 | The rest is omitted. | The rest is omitted. |
| | Electrolytic solution resistance | ○ | ○ | ○ | ○ | ○ | | |
| | Volume resistivity (Ω · cm) | 0.16 | 0.18 | 0.15 | 0.17 | 0.16 | | |
| | Bending resistance | ○ | ○ | ○ | ○ | ○ | | |
| | Bending resistance after heat-moisture treatment | ○ | ○ | ○ | ○ | ○ | | |
| | Tensile elongation (%) | 29 | 28 | 30 | 28 | 27 | | |

Examples B1 to B5 and Comparative Examples B1 and B2

Using a resin composition comprising 100 parts by mass of (G-1) and 250 parts by mass of (G-2), film forming was For the Comparative Example B2, the film was not able to be stably obtained because the peelability from the roller decreased as the temperature of preliminary heating was too high.

TABLE 2

|  |  | Example B1 | Example B2 | Example B3 | Example B4 | Example B5 | Comparative Example B1 | Comparative Example B2 |
|---|---|---|---|---|---|---|---|---|
| Amount of each component | (G-1) (parts by mass) | 100 | 100 | 100 | 100 | 100 | 100 | 100 |
|  | (G-2) (parts by mass) | 250 | 250 | 250 | 250 | 250 | 250 | 250 |
| Film-forming conditions | Preliminary heating temperature (° C.) | 160 | 130 | 180 | 160 | 160 | 90 | 260 |
|  | First roller temperature (° C.) | 175 | 175 | 175 | 155 | 135 | 175 | 175 |
|  | Second roller temperature (° C.) | 170 | 170 | 170 | 150 | 130 | 170 | 170 |

Examples C1 to C5 and Comparative Examples C1 and C2

Using a resin composition comprising 100 parts by mass of (H-1) and 250 parts by mass of (H-2), film forming was attempted in the same manner as in Example 1 except that the film-forming conditions were changed as shown in Table 3 below.

For Examples C1, C3, and C4, the film was able to be stably obtained either via the method of carrying out trimming on the roller, or via the film-forming method of carrying out trimming of both sides after peeling rather than on the first roller.

For Example C2 and Example C5, the film was able to be stably obtained via the method of carrying out trimming on the roller. In the film-forming method in which trimming of both sides is carried out after peeling rather than on the first roller, however, there were sometimes cases where a flaw(s) occurring on the side(s) of the melted film at the time of peeling the melted film propagated to tear the melted film. In order to stably obtain the film, it is considered necessary to carry out trimming on the roller.

For the Comparative Example C1, the film was not able to be stably obtained because the preliminary heating temperature was too low.

For the Comparative Example C2, the film was not able to be stably obtained because the peelability from the roller decreased as the temperature of preliminary heating was too high.

Examples 6-26

The same procedures as in Example 1 were followed in all respects except that the formulations of the thermoplastic resin compositions were changed as shown in any one of Tables 4 to 6, whereby films with a thickness of 300 μm were obtained. In addition, in each of the Examples, even with the film-forming method in which trimming of both sides is carried out after peeling rather than on the first roller, a film having a thickness of 300 μm was able to be obtained without trouble. The tests (i) to (vi) for physical properties were performed for the obtained film. The results are shown in any one of Tables 4 to 6.

Reference Example 1

Film-forming was attempted in the same manner as in Example 1 in all respects except that the formulation of the thermoplastic resin composition was changed as shown in Table 5. However, the melted film was not able to be stably and continuously produced. Thus, evaluation of the film was omitted.

TABLE 3

|  |  | Example C1 | Example C2 | Example C3 | Example C4 | Example C5 | Comparative Example C1 | Comparative Example C2 |
|---|---|---|---|---|---|---|---|---|
| Amount of each component | (H-1) (parts by mass) | 100 | 100 | 100 | 100 | 100 | 100 | 100 |
|  | (H-2) (parts by mass) | 250 | 250 | 250 | 250 | 250 | 250 | 250 |
| Film-forming conditions | Preliminary heating temperature (° C.) | 160 | 130 | 180 | 160 | 160 | 90 | 260 |
|  | First roller temperature (° C.) | 175 | 175 | 175 | 155 | 135 | 175 | 175 |
|  | Second roller temperature (° C.) | 170 | 170 | 170 | 150 | 130 | 170 | 170 |

TABLE 4

| | | Example 6 | Example 7 | Example 8 | Example 9 | Example 10 | Example 11 | Example 12 |
|---|---|---|---|---|---|---|---|---|
| Amount of each component (parts by mass) | (A1-1) | 60 | 60 | — | 30 | 80 | 60 | — |
| | (A1-1) | — | — | 60 | — | — | — | — |
| | (A1-3) | — | — | — | — | — | — | 60 |
| | (A2-1) | 40 | — | 40 | 70 | 20 | 40 | 40 |
| | (A2-2) | — | 40 | — | — | — | — | — |
| | (B-1) | 45 | 35 | 35 | 35 | 35 | 25 | 35 |
| | (C-1) | 20 | 40 | 40 | 40 | 40 | 60 | 40 |
| | (C'-1) | — | — | — | — | — | — | — |
| | (F-1) | 2 | 2 | 2 | 2 | 2 | 2 | 2 |
| Film-forming conditions | Preliminary heating temperature (° C.) | 160 | 160 | 160 | 160 | 160 | 160 | 160 |
| | First roller temperature (° C.) | 175 | 175 | 175 | 175 | 175 | 175 | 175 |
| | Second roller temperature (° C.) | 170 | 170 | 170 | 170 | 170 | 170 | 170 |
| Evaluation results | Initial conductivity (mΩ) | 73 | 97 | 7300 | 85 | 74 | 80 | 750 |
| | Electrolytic solution resistance | ◎ | ○ | Δ | Δ | Δ | Δ | ◎ |
| | Volume resistivity (Ω · cm) | 0.14 | 0.26 | 0.78 | 0.28 | 0.19 | 0.20 | 0.51 |
| | Bending resistance | ○ | ○ | ○ | ○ | ○ | ○ | ○ |
| | Bending resistance after heat-moisture treatment | ○ | ○ | ○ | ○ | ○ | ○ | ○ |
| | Tensile elongation (%) | 28 | 36 | 77 | 81 | 98 | 29 | 85 |

TABLE 5

| | | Example 13 | Example 14 | Example 15 | Example 16 | Example 17 | Example 18 | Reference Example 1 |
|---|---|---|---|---|---|---|---|---|
| Amount of each component (parts by mass) | (A1-1) | 20 | 90 | 60 | 60 | 60 | 60 | 60 |
| | (A1-2) | — | — | — | — | — | — | — |
| | (A1-3) | — | — | — | — | — | — | — |
| | (A2-1) | 80 | 10 | 40 | 40 | 40 | 40 | 40 |
| | (A2-2) | — | — | — | — | — | — | — |
| | (B-1) | 35 | 35 | 35 | 65 | 120 | — | 35 |
| | (C-1) | 40 | 40 | — | — | — | 100 | — |
| | (C'-1) | — | — | — | — | — | — | 40 |
| | (F-1) | 2 | 2 | 2 | 2 | 2 | 2 | 2 |
| Film-forming conditions | Preliminary heating temperature (° C.) | 160 | 160 | 160 | 160 | 160 | 160 | 160 |
| | First roller temperature (° C.) | 175 | 175 | 175 | 175 | 175 | 175 | 175 |
| | Second roller temperature (° C.) | 170 | 170 | 170 | 170 | 170 | 170 | 170 |
| Evaluation results | Initial conductivity (mΩ) | 88 | 76 | 140 | 79 | 73 | 8300 | Not film-formable |
| | Electrolytic solution resistance | Δ | X | Δ | Δ | Δ | X | |
| | Volume resistivity (Ω · cm) | 0.24 | 0.17 | 0.44 | 0.12 | 0.11 | 82400 | |
| | Bending resistance | ○ | ○ | ○ | Δ | X | X | |

TABLE 5-continued

|  | | Example 13 | Example 14 | Example 15 | Example 16 | Example 17 | Example 18 | Reference Example 1 |
|---|---|---|---|---|---|---|---|---|
| | Bending resistance after heat-moisture treatment | Δ | ○ | ○ | Δ | X | X | |
| | Tensile elongation (%) | 61 | 120 | 23 | 21 | 11 | 3 | |

TABLE 6

| | | Example 19 | Example 20 | Example 21 | Example 22 | Example 23 | Example 24 | Example 25 | Example 26 |
|---|---|---|---|---|---|---|---|---|---|
| Amount of each component (parts by mass) | (A3-1) | 100 | — | — | — | — | — | — | 100 |
| | (A3-2) | — | 100 | — | — | — | — | — | — |
| | (A3-3) | — | — | 100 | — | — | — | — | — |
| | (A3'-1) | — | — | — | 100 | — | — | — | — |
| | (A3'-2) | — | — | — | — | 100 | — | — | — |
| | (A3'-3) | — | — | — | — | — | 100 | — | — |
| | (A3'-4) | — | — | — | — | — | — | 100 | — |
| | (B-1) | 25 | 25 | 25 | 25 | 25 | 25 | 25 | 25 |
| | (C-1) | 40 | 40 | 40 | 40 | 40 | 40 | 40 | — |
| | (C-2) | — | — | — | — | — | — | — | 40 |
| Film-forming conditions | Preliminary heating temperature (° C.) | 160 | 160 | 160 | 160 | 160 | 160 | 160 | 160 |
| | First roller temperature (° C.) | 175 | 175 | 175 | 175 | 175 | 175 | 175 | 175 |
| | Second roller temperature (° C.) | 170 | 170 | 170 | 170 | 170 | 170 | 170 | 170 |
| Evaluation results | Initial conductivity (mΩ) | 260 | 250 | 270 | 250 | 260 | 250 | 250 | 310 |
| | Electrolytic solution resistance | ○ | ○ | ○ | X | ○ | X | Δ | ○ |
| | Volume resistivity (Ω·cm) | 0.78 | 0.97 | 0.91 | 0.42 | 0.61 | 0.44 | 0.64 | 1.1 |
| | Bending resistance | ◎ | ◎ | ◎ | Δ | X | X | Δ | ○ |
| | Bending resistance after heat-moisture treatment | ◎ | ○ | ◎ | Δ | X | X | Δ | ○ |
| | Tensile elongation (%) | 110 | 88 | 82 | 210 | 35 | 105 | 150 | 85 |

By optimally selecting components to be formulated and their ratios, along with the film-forming conditions, electrically conductive films with high electrical conductivity as well as excellent in tensile elongation, bending resistance, and flexibility were able to be obtained. On the other hand, for Comparative Example 1, no electrically conductive film was able to be obtained because the preliminary heating temperature was too low. For Comparative Example 2, the preliminary heating temperature was so high that the chlorinated polyethylene component of the thermoplastic resin composition suffered thermal degradation. For Reference Example 1, no electrically conductive film was able to be obtained because only Ketjen black was used as electrically conductive carbon.

Examples 27-31

The same procedures as in Example 1 were followed in all respects except that the formulations of the thermoplastic resin compositions were changed as shown in Table 7, whereby films with a thickness of 300 μm were obtained. In addition, in each of the Examples, even with the film-forming method in which trimming of both sides is carried out after peeling rather than on the first roller, a film having a thickness of 300 μm was able to be obtained without trouble. The tests (iv), (vi), and (vii) or (iv), (vi), and (viii) for physical properties were performed for the obtained films. The results are shown in Table 7.

TABLE 7

| | | Example 27 | Example 28 | Example 29 | Example 30 | Example 31 |
|---|---|---|---|---|---|---|
| Amount of each component (parts by mass) | (A4-1) | 100 | 100 | 100 | 100 | 100 |
| | (D-1) | 250 | — | — | — | — |
| | (D-2) | — | 250 | — | — | — |
| | (D-3) | — | — | 250 | — | — |
| | (D-4) | — | — | — | 250 | — |
| | (E-1) | — | — | — | — | 250 |
| Film-forming conditions | Preliminary heating temperature (° C.) | 160 | 160 | 160 | 160 | 160 |
| | First roller temperature (° C.) | 175 | 175 | 175 | 175 | 175 |
| | Second roller temperature (° C.) | 170 | 170 | 170 | 170 | 170 |
| Evaluation results | Bending resistance | ⊚ | ⊚ | ⊚ | ⊚ | ⊚ |
| | Tensile elongation (%) | 32 | 30 | 30 | 30 | 30 |
| | Water-absorbing function (g/m²) | 61 | 64 | 40 | 45 | — |
| | Deodorant function | — | — | — | — | ○ |

Using an appropriate amount of bentonite, films with high water-absorbing function were able to be obtained. In addition, using an appropriate amount of zeolite, films with high deodorant function were able to be obtained.

It is to be noted that the same advantageous effects may be obtained even when silver zeolite or copper zeolite that include negatively charged parts is used because the deodorant function by zeolite is due to negative charges.

Embodiments provide non-obvious advantages over the conventional art. For example, the production method according to various embodiments allows a film including a thermoplastic resin composition including a large number of parts of a filler to be obtained. It also allows a film including an electrically conductive thermoplastic resin composition to be obtained that has high conductivity and is excellent in tensile elongation, bending resistance, and flexibility and that can be suitably used as an electrode in electrolytic solution-circulating secondary batteries such as redox flow batteries, zinc-chlorine batteries, and zinc-bromine batteries, as well as a protective coating of the electrode.

A film obtained from the production method according to various embodiments is suitably used as an electrode in electrolytic solution-circulating secondary batteries, such as redox flow batteries, zinc-chlorine batteries, and zinc-bromine batteries, as well as a protective coating of the electrode.

REFERENCE SIGNS LIST

1: Highest melting point among peak top melting points in the DSC second melting curve
2: Integration of melting enthalpy in the temperature range of 110° C. or lower in the DSC second melting curve
3: Boundary line at a temperature of 110° C. in the DSC second melting curve
4: Electrode
5: Electrode

The invention claimed is:

1. A method for producing a film comprising a thermoplastic resin composition, the method comprising:
   (1) a step of subjecting a thermoplastic resin composition to preliminary heating at 100 to less than 190° C.;
   (2) a step of subjecting a first roller and second roller of a calender-roll film-forming apparatus to pre-heating at 100 to 190° C. for each of the first and second rollers; and
   (3) a step of introducing the thermoplastic resin composition, which has been subjected to preliminary heating in step (1), into a clearance between the first roller and second roller, which have been pre-heated in step (2), and continuously winding a melted film of the thermoplastic resin composition on the first roller,
   wherein a rotation rate of the first roller is faster than a rotation rate of the second roller, and
   wherein a ratio of the speed of the first roller to the speed of the second roller ranges from 1.3:1 to 3:1, which is kept at a constant ratio during the production of the film.

2. The method according to claim 1, further comprising:
   (4) a step of, on the first roller, continuously trimming both sides of the melted film and then continuously peeling the melted film off from the first roller.

3. The method according to claim 1, wherein the thermoplastic resin composition comprises:
   (A) 100 parts by mass of the thermoplastic resin;
   (B) 1 to 60 parts by mass of carbon nanotubes; and
   (C) 1 to 100 parts by mass of at least one selected from the group consisting of acetylene black and graphite.

4. The method according to claim 3, wherein the thermoplastic resin (A) is a resin mixture comprising:
   (A1) 30 to 80% by mass of a chlorinated polyethylene having a chlorine content of 20 to 45% by mass; and
   (A2) 70 to 20% by mass of a polyethylene other than (A1),
   wherein the sum of (A1) and (A2) is 100% by mass.

5. The method according to claim 4, wherein the highest melting point among peak top melting points in a DSC melting curve of component (A2) is 110° C. or lower.

6. The method according to claim 4, wherein component (A1) is amorphous.

7. The method according to claim 3, wherein the thermoplastic resin (A) is (A3) a polyethylene satisfying the following properties (p) and (q):
   (p) the highest melting point among peak top melting points in a DSC melting curve is 120° C. or higher; and
   (q) a fraction of melting enthalpy in a temperature range of 110° C. or lower relative to the total melting enthalpy in a DSC melting curve is 50 to 80%.

8. The method according to claim 1, wherein the thermoplastic resin composition comprises:
   (A) 100 parts by mass of the thermoplastic resin; and
   (D) 100 to 400 parts by mass of a bentonite.

9. The method according to claim 1, wherein the thermoplastic resin composition comprises:
   (A) 100 parts by mass of the thermoplastic resin; and
   (E) 50 to 300 parts by mass of at least one selected from the group consisting of zeolite, silver zeolite, and copper zeolite.

10. A film produced by the method according to claim 3.
11. A film produced by the method according to claim 8.
12. A battery comprising the film according to claim 10.
13. A film produced by the method according to claim 4.
14. A film produced by the method according to claim 5.
15. A film produced by the method according to claim 6.
16. A film produced by the method according to claim 7.
17. A film produced by the method according to claim 9.
18. The method according to claim 1, wherein a temperature of the first roller is higher than a temperature of the second roller.

* * * * *